Figure 1:
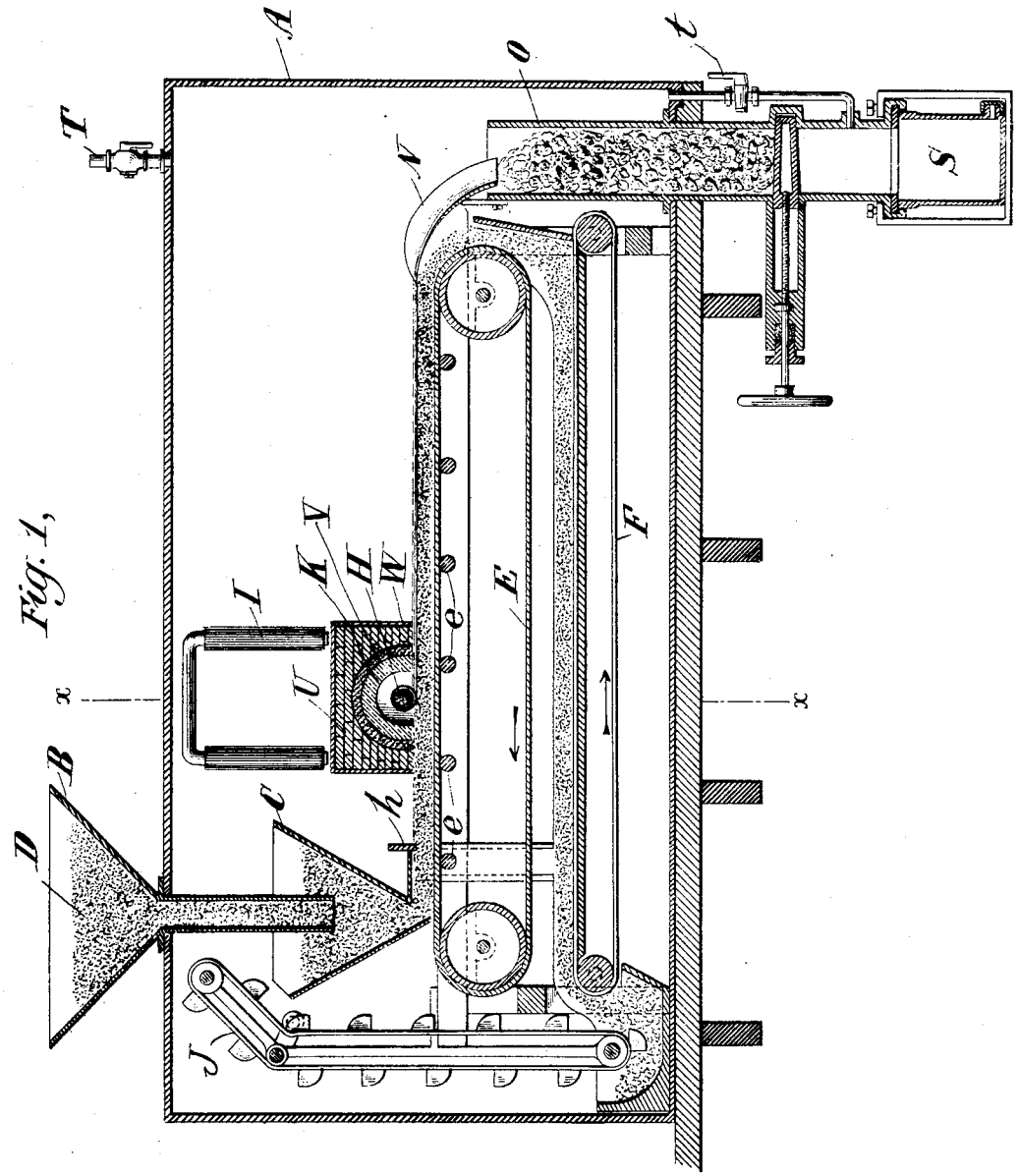

(No Model.) 2 Sheets—Sheet 1.
I. L. ROBERTS.
PROCESS OF AND APPARATUS FOR MAKING METALLIC CARBIDS.
No. 588,012. Patented Aug. 10, 1897.

WITNESSES:

INVENTOR
Isaiah L. Roberts
BY
ATTORNEY (No Model.) 2 Sheets—Sheet 2.
I. L. ROBERTS.
PROCESS OF AND APPARATUS FOR MAKING METALLIC CARBIDS.
No. 588,012. Patented Aug. 10, 1897.
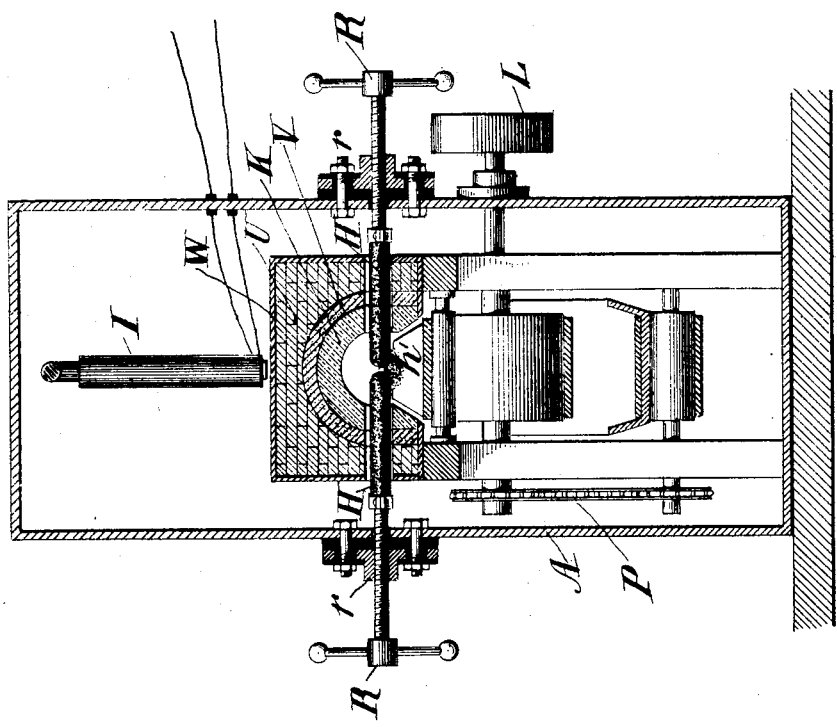
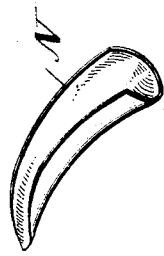
WITNESSES: INVENTOR
Isaiah L. Roberts
BY
ATTORNEY

UNITED STATES PATENT OFFICE.

ISAIAH L. ROBERTS, OF BROOKLYN, NEW YORK.

PROCESS OF AND APPARATUS FOR MAKING METALLIC CARBIDS.

SPECIFICATION forming part of Letters Patent No. 588,012, dated August 10, 1897.

Application filed September 14, 1896. Serial No. 605,702. (No model.)

*To all whom it may concern:*

Be it known that I, ISAIAH L. ROBERTS, of the city of Brooklyn, county of Kings, and State of New York, have invented a new and useful Improvement in the Process of and Apparatus for Making Metallic Carbids, of which the following is a full, true, and exact description, reference being had to the accompanying drawings.

Heretofore carbids have been obtained by causing an electric arc to be formed in a mass of a suitable mixture of oxid and carbon and afterward stopping the current and removing the carbid thus formed by the heat of the said arc. This process is slow and wasteful of energy. By my method hereinafter described I also make use of the electric arc; but my method is rapid and less wasteful of the energy, and this result is obtained by the use of a magnetically-deflected arc combined with suitable mechanical devices, which are fully set forth in the following specification, and shown in the annexed drawings, in which said drawings like letters of reference refer to like parts in all the figures.

My invention will be readily understood from the accompanying drawings, in which—

Figure 1 is a longitudinal cross-section of my apparatus. Fig. 2 is a cross-section through the line $x$ $x$, and Fig. 3 is a view of the separator.

In the figures, A represents a metallic casing; B, an outer chute, and C an inner chute; D, a mixture of oxid and carbon. Endless belts are shown at E and F. Two carbons are shown in position for producing an electric arc at H. An electromagnet is shown at I, and an endless-chain conveyer at J. A reflecting-dome is shown at K, inclosed in brickwork U.

To operate this apparatus and process, I make a mixture of pulverized oxid and carbon in the proper proportion to form carbid and fill up the chute B with it, as shown at D. This mixture will partly fill the second chute C. I next set the driving-pulley L in motion, which will move the endless belt E, and F will be moved by the chain belt P. As the chute C is placed so that its opening is directly over the endless belt E and said opening being less in width than said belt, the mixture above mentioned will rest thereon, and as the motion of the said belt is in the direction of the arrow the mixture will be carried forward toward the electric arc H by the belt E, which forms a continuous ridge or mass of the mixture by a scraper, as shown at $h$. When this mass passes under the carbons H, I cause an electric arc to be formed at the point shown. The carbons should not touch the oxid mixture. At the same time the arc is formed the electromagnet I is energized as thoroughly as is necessary to cause the flame of the arc to be projected downward into the oxid mixture, which will heat it hot enough to form carbid on the surface of the bed or ridge of the mixture $h'$. The flakes or scales of the carbid will be scooped off of the mass on the thin blade-like scoop N, Fig. 3, and dropped into the tube O and onto the gate-valve, from whence it is dropped from time to time by opening the said valve into the receptacle S, which when full can be removed, the gate-valve being previously closed to prevent air from entering. The mixture which is not converted into carbid falls onto the lower belt F and is carried back to the endless-chain carrier J, which elevates it to the chute C, from whence it is again carried toward the scraper and to the arc.

Above the arc H, I place a hollow dome K, made of lime-bricks or of a hollowed-out piece of limestone, which may be calcined before placing in the furnace, which, when heated to a very high temperature by the arc, becomes a good reflector of heat and thereby assists the said arc in producing carbid or metals by concentrating the heat on the mixture. Over this I place a thick layer of very finely pulverized lime as a jacketing to prevent the loss of heat by radiation, as shown at V, and over this I build a complete brickwork U and inclose the same in a metal jacket W. When the belt E moves the mass or mixture forward toward the arc H, the lower part of the furnace or dome-casing V may be used as a scraper to scrape off the top of the mass, so as to form a level surface instead of the scraper $h$.

The carbon electrodes are adjusted by turning the screws R R, which are held in insulated bosses $r$ $r$, when loss from use makes it necessary.

If the aforesaid dome be made of unburned limestone, the electric arc should be started with a comparatively small current. Otherwise the said limestone will be injured by cracking or chipping. If the said dome is properly constructed and of sufficiently refractory material, as is the aforesaid limestone, carbids can be made without the use of the magnet; but I prefer the use thereof in combination.

I prefer to carry on the whole operation in a non-oxidizing atmosphere in a closed chamber. I therefore inclose the whole with an air-tight casing A, which completely incloses it, except where the chute B enters. The chute C should at all times have enough of the mixture in it to make a seal from the air.

In the production of carbids from oxids carbonic oxid and hydrogen and other gases are formed, which may be utilized by leading them out at the pipes T or t. These will soon fill up the chamber on starting; but I prefer to fill the chamber with a gas containing so little oxygen previously that an explosion is not possible.

In constructing the metallic casing no metal capable of being magnetized should be used near enough to the arc to injuriously influence the same. I prefer to make the belts of asbestos cloth and support the upper one, E, by rollers e e e e.

It is obvious that in practice the carbon poles H will be made adjustable, either by the well-known automatic feeding mechanism or by hand by rods extending without the casing. It is also obvious that eyeholes, which may be made sliding, can be employed in different parts of the casing for observation.

What I claim as my invention, and desire to secure by Letters Patent, is—

1. The process of continuously forming metallic carbids, which consists in moving beneath a horizontal electric arc the metallic compound and carbon to be converted, and in reflecting the heat of said arc downward, substantially as described.

2. The process of continuously forming metallic carbids, which consists in moving beneath a horizontal electric arc the metallic compound and carbon to be converted, in deflecting said arc downward by means of a magnet, and in reflecting the heat of said arc downward, substantially as described.

3. The process of continuously forming metallic carbids, which consists in moving beneath a horizontal electric arc the metallic compound and carbon to be converted, and in reflecting the heat of said arc downward, the process being carried out in a non-oxidizing atmosphere, substantially as described.

4. The combination in an electric furnace, of a traveling conveyer for moving a body of the material to be converted beneath an electric arc, a reflecting-dome above said arc and suitably-arranged carbons for forming a horizontal electric arc, whereby the mixed material is changed, substantially as described.

5. The combination in an electric furnace, of a traveling conveyer for moving a body of the material to be converted beneath an electric arc, a reflecting-dome above said arc, suitably-arranged carbons for forming a horizontal electric arc, whereby the mixed material is changed, and a separator for separating the changed from the unchanged material, substantially as described.

6. The combination in an electric furnace, of a traveling conveyer for moving a body of the material to be converted beneath an electric arc, a reflecting-dome above said arc, suitably-arranged carbons for forming a horizontal electric arc, whereby the mixed material is changed, a separator for separating the changed from the unchanged material, and a conveyer for returning the unchanged material to the belt, substantially as described.

7. The combination in an electric furnace, of a traveling conveyer for moving a body of the material to be converted beneath an electric arc, a reflecting-dome above said arc, suitably-arranged carbons for forming a horizontal electric arc, and an electromagnet for deflecting said electric arc, whereby the mixed material is changed, substantially as described.

8. The combination in an electric furnace, of a traveling conveyer for moving a body of the material to be converted beneath an electric arc, a reflecting-dome above said arc, suitably-arranged carbons for forming a horizontal electric arc, an electromagnet for deflecting said electric arc, whereby the mixed material is changed, and a separator for separating the changed from the unchanged material, substantially as described.

9. The combination in an electric furnace, of a traveling conveyer for moving a body of the material to be converted beneath an electric arc, a reflecting-dome above said arc, suitably-arranged carbons for forming a horizontal electric arc, an electromagnet for deflecting said electric arc, whereby the mixed material is changed, a separator for separating the changed from the unchanged material, and a conveyer for returning the unchanged material to the belt, substantially as described.

10. The combination in an electric furnace, of a feed for feeding mingled material upon a traveling belt, a traveling belt for moving the material toward an electric arc, a reflecting-dome above said arc, mechanism for producing an electric arc in proximity to said material, and separating mechanism for separating the material changed by the electric arc from the material fed to the belt, substantially as described.

In testimony whereof I have signed my name to this specification in the presence of two subscribing witnesses.

ISAIAH L. ROBERTS.

Witnesses:
ANTHONY GREF,
H. COUTANT.